United States Patent [19]
Diakides et al.

[11] 3,733,135
[45] May 15, 1973

[54] METHOD AND APPARATUS FOR MEASURING IMAGE FORMING PROPERTIES OF AN IMAGE DISPLAY PANEL

[75] Inventors: Nicholas A. Diakides, Alexandria, Richard L. Sormberger, Springfield, both of Va.

[73] Assignee: The United States of America as represented by the Secretary of the Army, Washington, D.C.

[22] Filed: June 23, 1971

[21] Appl. No.: 155,698

[52] U.S. Cl. ................356/156, 356/164, 356/124, 313/64
[51] Int. Cl. ........G01b 11/00, G01b 9/08, G01b 9/00
[58] Field of Search......................356/168, 121, 124, 356/156

[56] References Cited
UNITED STATES PATENTS 3,438,713    4/1969    Hennacher et al. ..................356/124

*Primary Examiner*—William L. Sikes
*Assistant Examiner*—Conrad Clark
*Attorney*—Harry M. Saragovitz, et al.

[57] ABSTRACT

Method and apparatus for measuring image forming properties of optical and electro-optical systems in terms of modulation transfer function wherein the apparatus comprises a simple lens focussing system, a filar eye piece with a desired pattern, a photomultiplier and associated mechanisms for aligning the pattern with an optical image, and a variable speed reversible motor for scanning the pattern over the image; and wherein the method provides objective electronic focusing and alignment of the image.

8 Claims, 3 Drawing Figures

INVENTORS
NICHOLAS A. DIAKIDES
RICHARD L. SORMBERGER

INVENTORS
NICHOLAS A. DIAKIDES
RICHARD L. SORMBERGER

METHOD AND APPARATUS FOR MEASURING IMAGE FORMING PROPERTIES OF AN IMAGE DISPLAY PANEL

The invention described herein may be manufactured, used and licensed by or for the Government for governmental purposes without the payment to us of any royalty thereon.

BACKGROUND OF INVENTION

This invention relates to the art of measuring image forming properties of optical and electro-optical systems such as lenses, cathode ray tubes, image intensifiers, phosphor screens, and in general, any image display panel. Still more specifically, the invention has been developed for use in measuring the modulation transfer function (MTF) characteristics of high resolution cathodoluminescent screens.

In the fabrication of luminescent screens for use in image display devices, it is highly desirable to have some objective test or method for comparing and rating the image forming properties of these screens before they are incorporated into image tubes. The present invention provides a practical optical system for measuring the modulation transfer function (MTF) of luminescent screen, lenses, and any image producing display. The invention has been found particularly useful in testing the luminescent screens, which are being used in image intensifier tubes where the screen is required to meet rigid and exacting specifications.

In the prior art, the MTF evaluation of optical systems such as lenses, luminescent screens, cathode ray tubes, and image display devices, requires the use of very complex and expensive MTF evaluation systems. In general, the principle of operation of an MTF system is based upon the scanning of the image to be evaluated with an optical pattern and having the right output signal detected by a photomultiplier whose response is displayed on a recorder or an oscilloscope. The construction of these MTF systems, therefore, consists of scanning mechanisms employing variable frequency patterns such as moire, sine wave, and bar-pattern in conjunction with the necessary special lenses and electronic-equipment, to provide MTF evaluation of the optical component under test. However, the major disadvantages of the existing MTF analyzers are high cost, complexity, large size and weight, low sensitivity at low light levels, and lack of flexibility for general use. Of prime importance is the low sensitivity at low light levels which prohibits proper evaluation of luminescent screens utilized in image intensifier applications. If has been found that the lack of sensitivity in the prior art devices is mainly due to inaccuracy in focusing and alignment and the use of high power magnification as to achieve a desired frequency scan range which factors contribute to a loss of output light level. Another factor contributing to a loss of light output is vibration introduced by the scanning pattern which of course degrades the output response of the system.

SUMMARY OF THE INVENTION

The present invention provides an improved modulation transfer function apparatus for evaluating image display panels having high sensitivity at low light levels by means of accurate objective focusing and alignment and low power magnification.

Accordingly, it is an object of the present invention to provide a compact MTF analyzer having high sensitivity at low light levels.

It is another object of the present invention to provide an apparatus wherein the scanning pattern is in the form of a filar eye piece.

It is a further object of the present invention to provide for objective electronic focusing and alignment of the apparatus.

It is a still further object to provide an apparatus wherein system magnification is at low power levels.

It is yet another object of the present invention to provide an arrangement wherein the scanning of the image is carried out with minimum vibration.

These objects and other features and advantages of the present invention will become more apparent upon an inspection of the following specification taken in conjunction with the accompanying drawing wherein:

DESCRIPTION OF INVENTION

Figure 1:
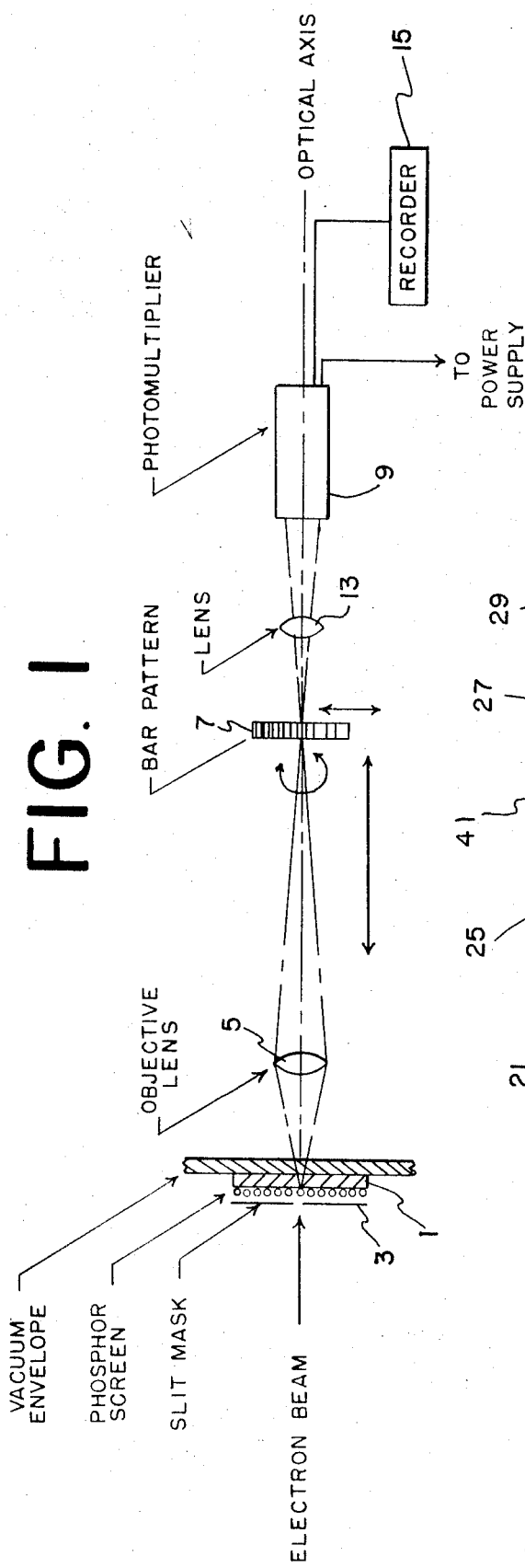
FIG. 1 is a schematic view illustrating the operating principle of the present invention.

Referring now to the drawing, FIG. 1 illustrates the basic system of the present invention and shows a luminescent screen 1 which is to be evaluated. The screen is mounted in an electron tube having a slit mask 3 arranged to provide a line image when an electron beam is focused on the screen. The formed line image is focused by an objective lens 5 onto a filar eye piece 7 having a bar-pattern (also referred to as a square-wave pattern) inscribed thereon. A photomultiplier 9 is mounted behind the eye piece by means of a coupling member 11 carrying a lens 13 for passing the light rays to the photomultiplier which provides an output signal to a recorder 15. A power supply is connected to provide power to the photomultiplier.

Figure 2:
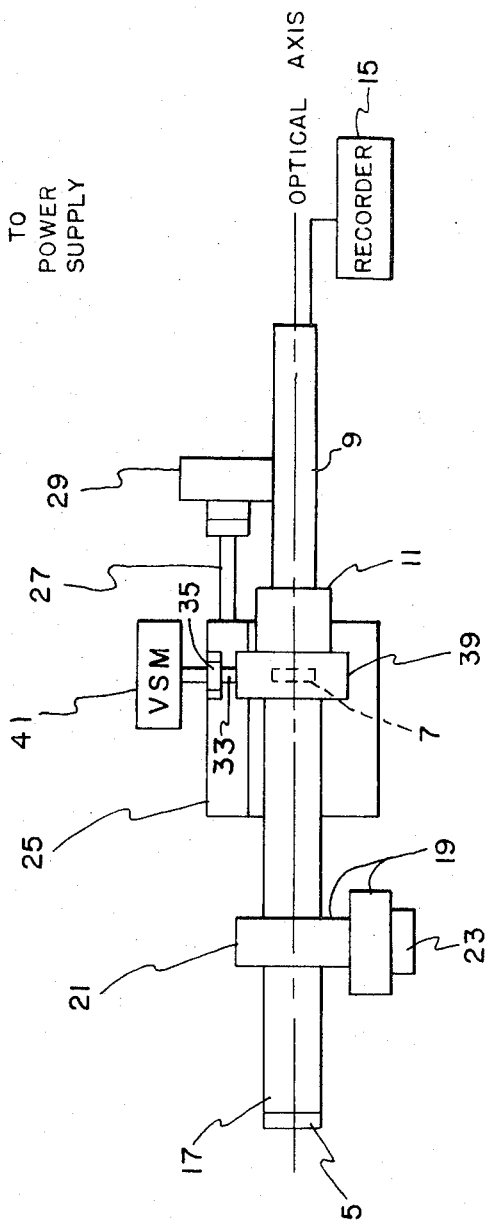
FIG. 2 is a schematic top view of the apparatus of this invention.

As shown in FIG. 2, the objective lens 5 is mounted on one end of tubulation 17, the other end of which has the filar eye piece 7 containing a bar-pattern on an optical disc mounted in place of traveling hairlines. A rotational gear arrangement 19 and 21 controlled by a motor 23 provides rotation of the microscope tube 17, thus permitting accurate alignment of the bar-pattern with the image as will be discussed hereafter. The optical system is supported on a traveling base 25 which provides longitudinal motion with the use of a micrometer 27 driven by a motor 29 for permitting objective electronic focusing as will be hereinafter discussed. The overall system is preferably mounted on a vibration isolation platform in order to prevent modulation loss at high spatial frequencies.

Figure 3:
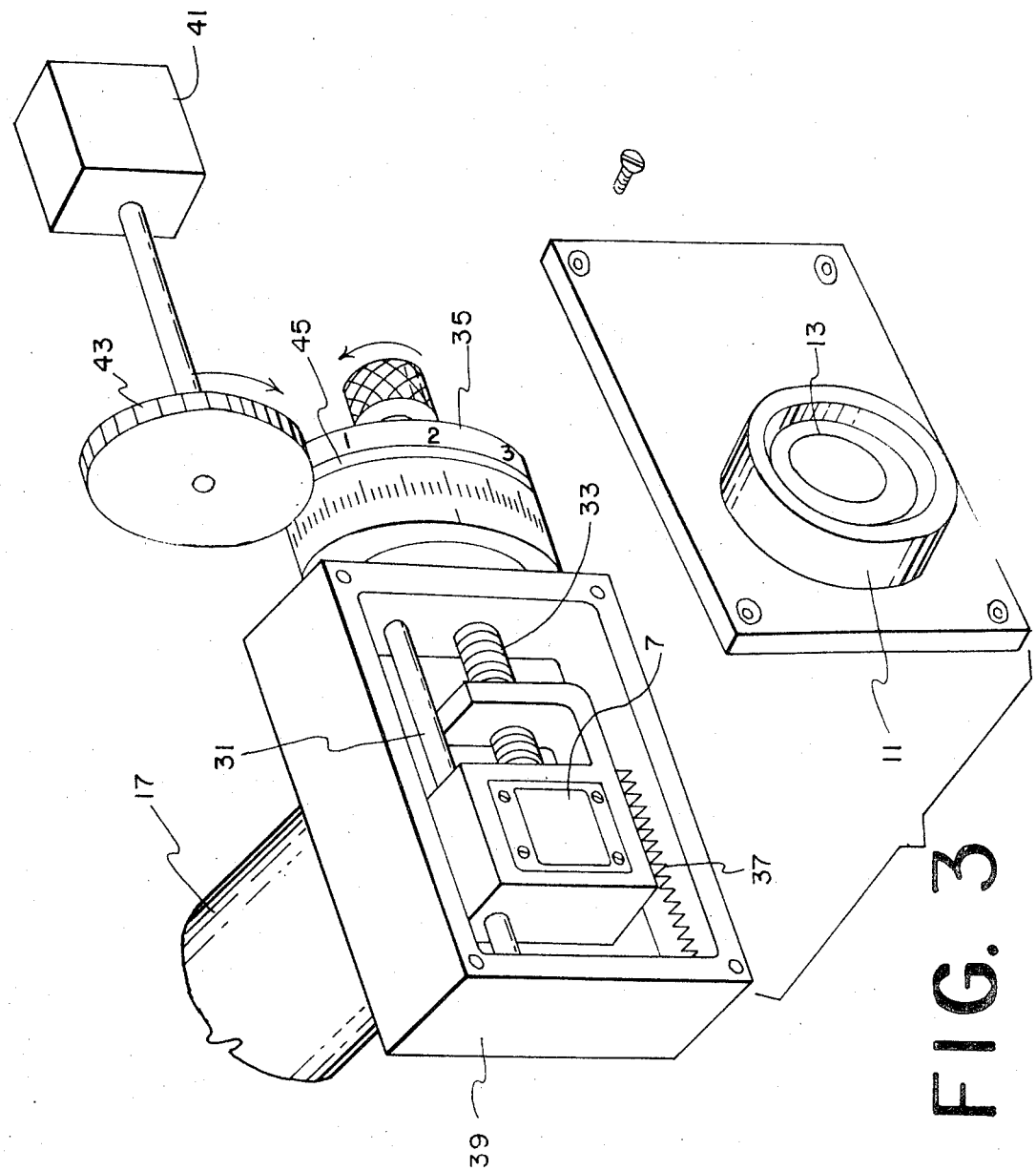
FIG. 3 is a schematic view of the scanning mechanism for the filar eye piece.

The scanning of the image by the bar-pattern is accomplished by moving the bar-pattern across the line image in a direction normal to the longitudinal axis of the system. As shown in FIG. 3, the filar eye piece with the bar-pattern is carried on a guide bar 31 and driven by a lead screw 33 connected to a micrometer drum 35. A spring 37 is utilized to maintain the filar eye piece in tension. The eye piece is positioned within a light tight housing 39 which is coupled to the microscope tube on one end and is provided with a photomultiplier adapter 11 and lens 13 at the other end. For scanning, a reversible variable speed motor 41 is coupled to the micrometer drum by means a serrated drum 43 which contacts a rubber ring 45 carried on the circumference of the drum. Thus, energization of the motor causes the lead screw to be rotated which causes movement of the eye piece along the guide bar. This type of drive is utilized to reduce vibration in the scanning which would result in loss of light and a degradation in the system evaluation. The motor 41 is of a variable speed type which slows the rate of scan at the higher frequencies of the bar-pattern (square-wave pattern) which, for example, may have a frequency range of 2 to 40 cycles per millimeter, in order to compensate for the response time of the recorder at such frequencies.

In accordance with the method of evaluating the image display, the display is arranged to project an image along the optic axis of the system with the electron beam being focused on the phosphor screen 1 such that the slit mask 3 causes a line image to be illuminated by the phosphor screen. The objective lens 5 is then positioned to focus the image on the filar eye piece. This is accomplished by utilizing the output of the photomultiplier 9 to maximize the response thereof and utilizing the output signal to control the energization of the motor 25 which drives micrometer 23 for positioning the bed 21 such that upon proper focusing, a maximum amplitude signal is obtained from the photomultiplier 9.

The next step is to obtain proper alignment of the bar-pattern and the projected line image. Here again, the output of the photomultiplier is utilized to control the rotation of the filar eye piece to achieve accurate alignment which is signified by a maximum amplitude output signal from the photomultiplier.

The motor 19 is energized to drive the rotational gear mechanism 15 and 17 for causing rotation of the tubulation 13 which carries the filar eye piece 7 at one end thereof. A significant aspect of this invention is that by use of the objective electronic focusing and alignment there is no need to change the position the line image which for a phosphor screen would require the repositioning of the slit mask within the vacuum tube.

After assuring that the apparatus is properly focused and aligned, the device is ready for evaluation of the phosphor screen. The evaluation is accomplished by causing the bar-pattern on the filar eye piece to be scanned through the line image focused thereon and having the total light flux passed through the filar eye piece detected by the photomultiplier and recorded by the recorder. The scanning is achieved by rotating the lead screw which carries the filar eye piece mounting in order to provide a linear scan motion of the bar-pattern. The linear movement is virtually vibration free which is not true of a rotational motion scan. Additionally, the scan speed is varied in accordance with the increasing frequency of the bar-pattern and the total light flux passed is detected by the photomultiplier and recorded by the recorder.

The described image display evaluation system is particularly well suited for low light level conditions because in addition to provide for accurate alignment and focusing provides for minimum magnification and thus reduces light loss in the optic system. For example, due to the use of a wide frequency range high resolution bar-pattern, e.g. 2 to 40 cycles per millimeter a small power objective lens such as a 5X lens may be utilized to achieve an actual frequency range of 10 to 200 cycles per millimeter. Additionally, the present system utilizes a slit mask of 1.5 microns to provide an extremely narrow line image for low light level evaluation and which requires the objective alignment and focusing to obtain accurate results and proper evaluation of the display.

It should be noted that although the invention has been described particularly with reference to luminescent image displayes, the invention may be utilized for evaluation of optical and electro-optical systems. Additionally, it is within the scope of this invention to employ feedback loops between the photomultiplier and the various motors for providing automatic focusing and alignment of the apparatus. Accordingly, modifications of the invention may be made without departing from the spirit and scope thereof as set forth in the appended claims.

We claim:

1. Apparatus for determining the image forming quality of a low light level image display panel comprising in combination:

means to excite said image display panel;

means adjacent said panel to provide a line image therefrom on the order of 1.5 microns;

a filar eye piece having a variable frequency high-resolution square-wave pattern with a range from 2 to 40 cycles per millimeter inscribed thereon;

a low-magnification objective lens of up to 5 power for focusing the line image on said filar eye piece and for providing maximum light transmission;

a tube having said filar eye piece and said objective lens mounted at opposite ends thereof;

a photomultiplier positioned behind said filar eye piece for detecting the total light flux passed by said filar eye piece and providing an output signal indicative thereof;

means for recording the output signal from said photomultiplier;

means for moving said objective lens along the longitudinal axis of the apparatus for focusing;

means for rotating said filar eye piece about the longitudinal axis thereof for aligning the pattern inscribed thereon with the line image of the display panel; and means for moving said filar eye piece in a direction normal to the longitudinal axis at a controlled rate of speed to provide for scanning of the line image of the variable frequency pattern.

2. Apparatus as defined in claim 1 wherein said means for focusing said objective lens includes:

a longitudinally traveling carriage having said tube mounted thereon; and a motor coupled to said carriage, said motor being energized in accordance with the output signal of said photomultiplier to move said objective lens to a position whereat said photomultiplier provides maximum output signal.

3. Apparatus as defined in claim 2 wherein said means for aligning said filar eye piece pattern with the line image includes:

rotational gear means for rotating said tube having said filar eye piece mounted at one end thereof, and a motor coupled to said gear arrangement, said motor being energized in accordance with the output signal of said photomultiplier to rotate said filar eye piece to a position whereat said photomultiplier provides maximum output signal.

4. Apparatus as defined in claim 3 wherein said scanning means for said filar eye piece includes:
a guide bar for carrying said filar eye piece;
a lead screw coupled to said filar eye piece; and
motor means for driving said lead screw to cause said filar eye piece to move in a direction normal to the longitudinal axis of the system.

5. Apparatus as defined in claim 4 wherein said motor means includes:
a micrometer drum connected to one end of said lead screw shaft;
a rubber ring carried on the circumference of said drum;
a serrated roller positioned in the plane of said drum with the circumference thereof contacting said rubber ring; and
a reversible variable speed motor connected to said roller for rotating said roller thereby causing said drum and lead screw to rotate, said motor providing a variable speed drive in accordance with increasing frequency scan lines of the variable frequency bar-pattern.

6. Apparatus as defined in claim 5 and further including a low magnification lens positioned between said filar eye piece and said photomultiplier for focusing the light flux passed by said filar eye piece onto said photomultiplier.

7. A method for determining the image forming quality of an image display panel, comprising the steps of:
generating a light line image on the image display panel on the order of 1.5 microns;
passing the line image through an optical system having a low-magnification objective lens of up to 5 power and a filar eye piece with a variable frequency high resolution square-wave pattern thereon with a range from 2 to 40 cycles per millimeter;
detecting the light signal passed through the system and converting the light signal to an electrical output signal;
focusing the line image on the filar eye piece by moving the objective lens in response to the output signal to a position corresponding to maximum output signal;
aligning the pattern of the filar eye piece with the line image by rotating the filar eye piece in response to the output signal to a position corresponding to maximum output signal;
scanning the line image by moving the filar eye piece across the optic axis of the system to provide for frequency modulation of the image; and
recording the output signal.

8. The method as defined in claim 7 further comprising the step of varying the rate at which the filar eye piece is moved across the optic axis in accordance with increasing frequency scan lines of the filar eye piece pattern.

* * * * *